(12) United States Patent
Balmer

(10) Patent No.: US 10,760,729 B2
(45) Date of Patent: *Sep. 1, 2020

(54) TRIPOD

(71) Applicant: Vitec Holdings Italia Srl, Cassola (IT)

(72) Inventor: Noah Balmer, Santa Rosa, CA (US)

(73) Assignee: Vitec Holdings Italia SRL, Cassola (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,595

(22) Filed: Aug. 18, 2019

(65) Prior Publication Data

US 2020/0011479 A1    Jan. 9, 2020

Related U.S. Application Data

(63) Continuation of application No. 15/458,743, filed on Mar. 14, 2017, now Pat. No. 10,386,012.

(51) Int. Cl.
| | | |
|---|---|---|
| *F16M 11/14* | (2006.01) | |
| *F16M 11/40* | (2006.01) | |
| *F16M 11/32* | (2006.01) | |
| *G03B 17/00* | (2006.01) | |
| *G03B 17/56* | (2006.01) | |
| *F16M 11/24* | (2006.01) | |
| *F16M 13/00* | (2006.01) | |
| *F16M 11/06* | (2006.01) | |
| *F16M 11/04* | (2006.01) | |
| *F16M 11/12* | (2006.01) | |

(52) U.S. Cl.
CPC .............. *F16M 11/40* (2013.01); *F16M 11/14* (2013.01); *F16M 11/24* (2013.01); *F16M 13/00* (2013.01); *G03B 17/561* (2013.01); *F16M 11/04* (2013.01); *F16M 11/06* (2013.01); *F16M 11/12* (2013.01)

(58) Field of Classification Search
CPC ........ F16M 11/04; F16M 11/06; F16M 11/12; F16M 11/14; F16M 11/40
USPC .................. 248/163.1, 169, 171, 181.2, 371; 396/428
See application file for complete search history.

(56) References Cited

U.S. PATENT DOCUMENTS

| | | | | |
|---|---|---|---|---|
| 3,632,073 | A * | 1/1972 | Nakatani ................ | F16M 11/14 248/169 |
| 3,873,996 | A * | 4/1975 | Varteressian ........ | A42B 3/0473 2/421 |
| 10,386,012 | B2 * | 8/2019 | Balmer .................. | F16M 11/14 |
| 2007/0152116 | A1 * | 7/2007 | Madsen ................ | F16M 11/14 248/181.1 |
| 2008/0023607 | A1 * | 1/2008 | Barker .................... | F16M 11/08 248/288.51 |
| 2008/0283697 | A1 * | 11/2008 | Darrow .................. | B60R 11/02 248/163.1 |
| 2010/0314508 | A1 * | 12/2010 | Bevirt .................. | F16M 11/041 248/121 |

* cited by examiner

*Primary Examiner* — Tan Le
(74) *Attorney, Agent, or Firm* — Michael A. Guth

(57) ABSTRACT

A tripod with flexible legs with a mounting interface for a camera, mounting clip, or electronic device that is movable into a variety of positions. The mounting interface may move around a spherical mating surface and may also be moved to a position perpendicular to the main axis of the tripod. The legs may have ball and socket connectors with external gripping rings adapted to wrap around an object such as a pole.

3 Claims, 11 Drawing Sheets

TRIPOD

CROSS-REFERENCE TO RELATED APPLICATIONS

This application is a continuation of U.S. patent application Ser. No. 15/458,743 to Balmer, filed Mar. 14, 2017, which is hereby incorporated by reference in its entirety.

FIELD OF THE INVENTION

This invention relates to tripods, namely a tripod with a swiveling head unit.

SUMMARY

Figure 1A:
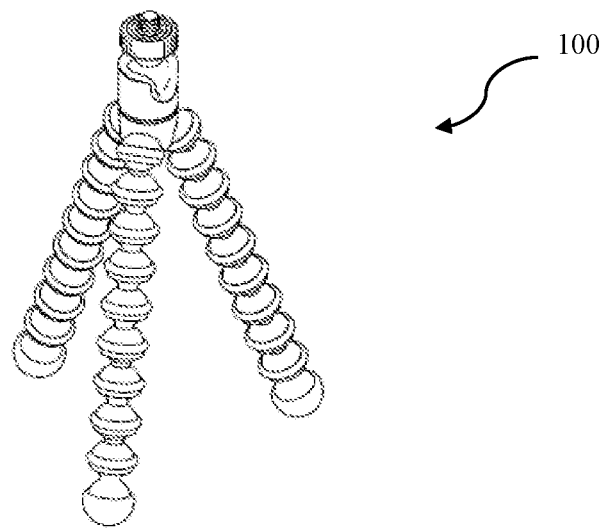
FIGS. 1A-1F illustrate a tripod in a first configuration with the mounting interface vertical according to some embodiments of the present invention.
Figure 1B:
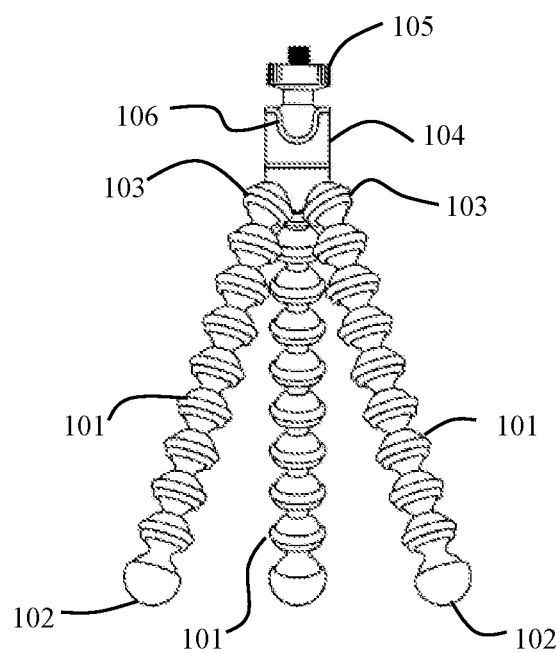
Figure 1C:
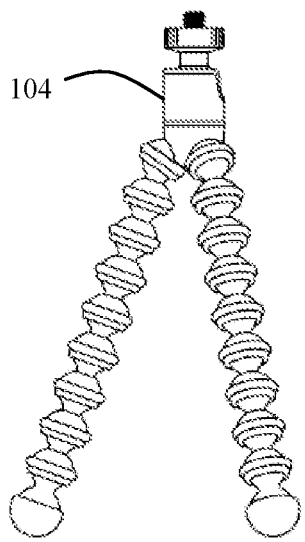
Figure 1D:
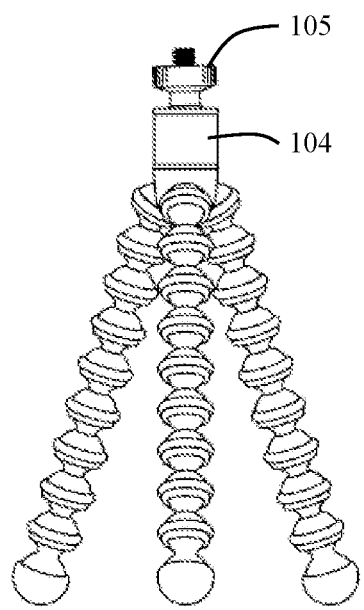
Figure 1E:
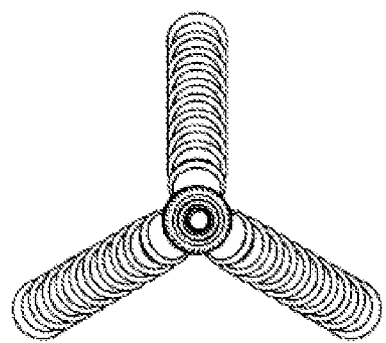
Figure 1F:
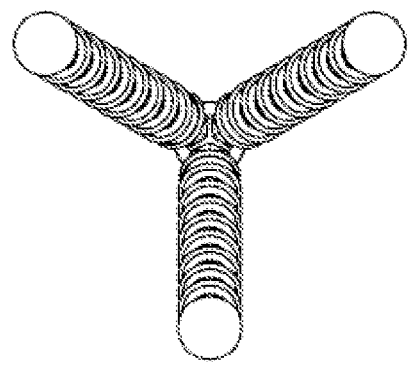

A tripod with flexible legs with a mounting interface for a camera, mounting clip, or electronic device that is movable into a variety of positions. The mounting interface may move around a spherical mating surface and may also be moved to a position perpendicular to the main axis of the tripod. The legs may have ball and socket connectors with external gripping rings adapted to wrap around an object such as a pole.

DETAILED DESCRIPTION

In a first vertical configuration according to some embodiments of the present invention, a tripod 100 has three flexible legs 101. The flexible legs 101 may be of a plurality of ball and socket connectors coupled to a tripod body 104. The flexible legs may have grip rings, or other gripping features, of a more resilient, frictional, material. The flexible legs 101 are coupled to the tripod body 104 at ports 103, which may be angle out from vertical to facilitate the wrapping of the legs around an object. The flexible legs 101 may have feet 102 of a resilient, frictional, material.

The tripod body 104 is coupled to a mounting interface 105. The mounting interface 105 may include a threaded post adapted to screw into a mating component, such as a mounting clip, a camera, or other device. The mounting interface 105 has a spherical ball 117 adapted to reside within a mating socket 110 of the tripod body 104. The mating socket 110 has a cutout 106 which allows the mounting interface to move from a vertical orientation, as seen in FIGS. 1A-F, to a horizontal configuration.

The flexible legs are adapted to move to a variety of positions as needed to provide support for the tripod and the items which it is supporting. In some aspects, the flexible legs are of a plurality of connector pieces coupled with ball and socket joints. The connector pieces may have an external grip ring of a frictional material such that the flexible legs may be wrapped around an object, such as a pole, with sufficient grip to support the tripod and the items which it supports.

Figure 2A:
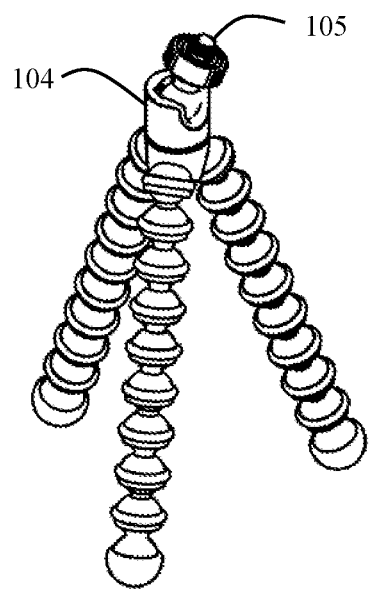
FIGS. 2A-2C illustrate a tripod in a second configuration with the mounting interface tilted according to some embodiments of the present invention.
Figure 2B:
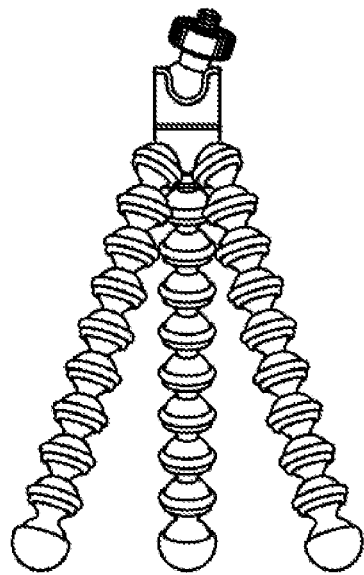
Figure 2C:
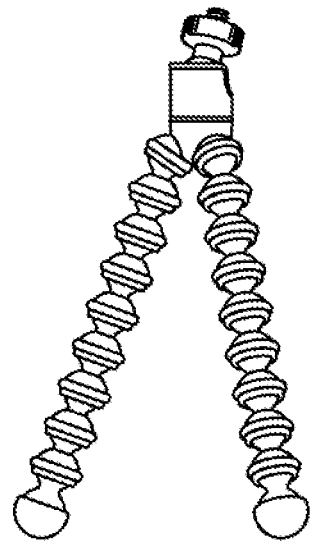
Figure 3A:
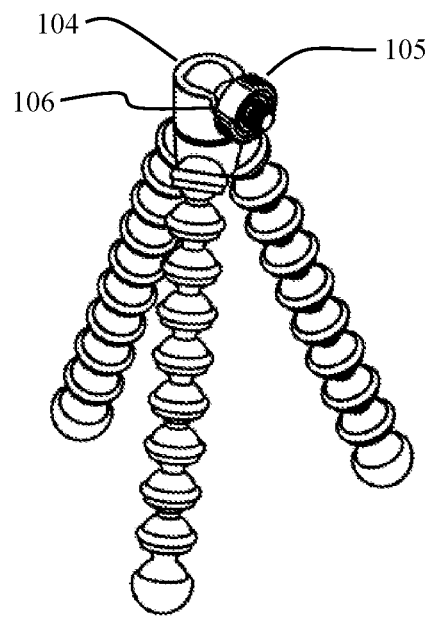
FIGS. 3A-3E illustrate a tripod in a third configuration with the mounting interface horizontal according to some embodiments of the present invention.
Figure 3B:
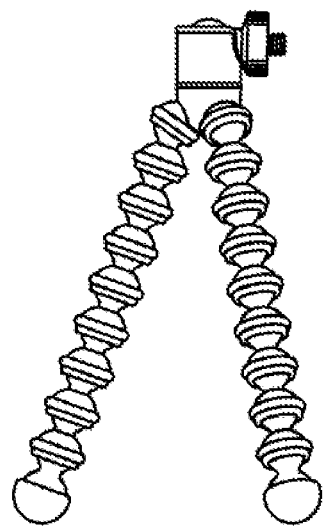
Figure 3C:
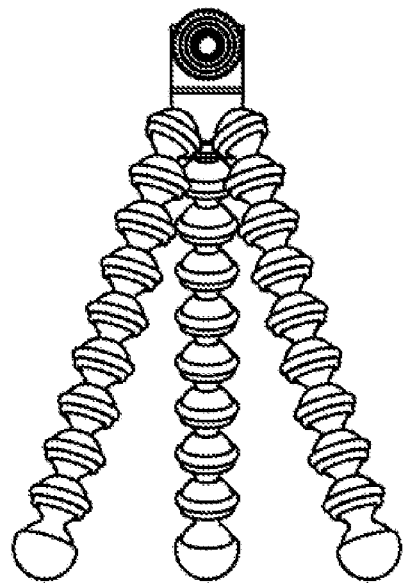
Figure 3D:
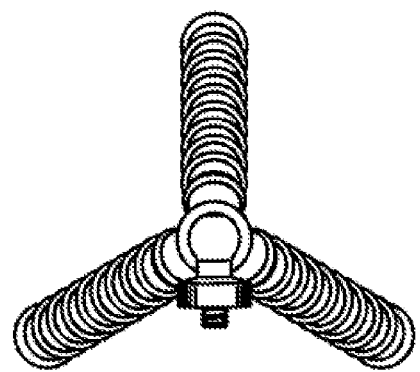
Figure 3E:
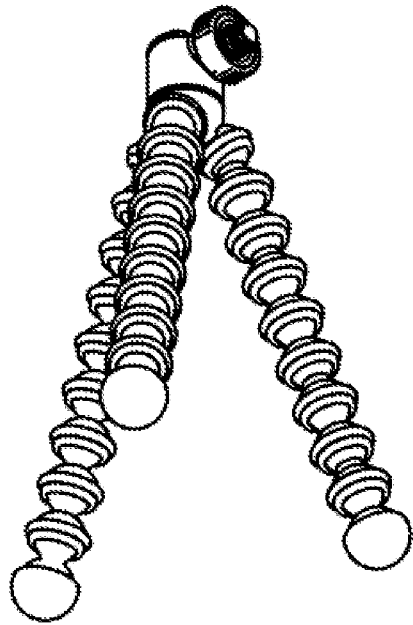

FIGS. 2A-2C illustrate the tripod 100 in a second configuration where the mounting interface 105 is tilted relative to the main axis of the tripod body 104. The interface between the mounting interface 105 and the tripod body 104 has sufficient friction to allow a selected position to be retained. The mounting interface may be moved by hand, by the user, but then will retain the selected position.

FIGS. 3A-3E illustrate the tripod 100 in a third configuration where the mounting interface 105 is moved to the perpendicular relative to the main axis of the tripod body 104. The mounting interface utilizes the space circumscribed by the cutout 106 to move into the third configuration. The interface between the mounting interface 105 and the tripod body 104 has sufficient friction to allow a selected position to be retained. The mounting interface may be moved by hand, by the user, but then will retain the selected position.

Figure 4:
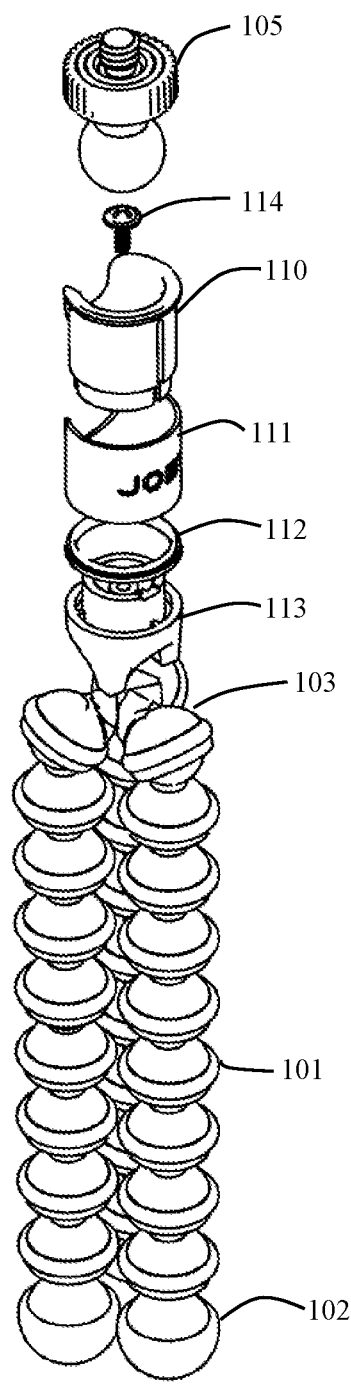
FIG. 4 is an exploded perspective view of a tripod according to some embodiments of the present invention.
Figure 5:
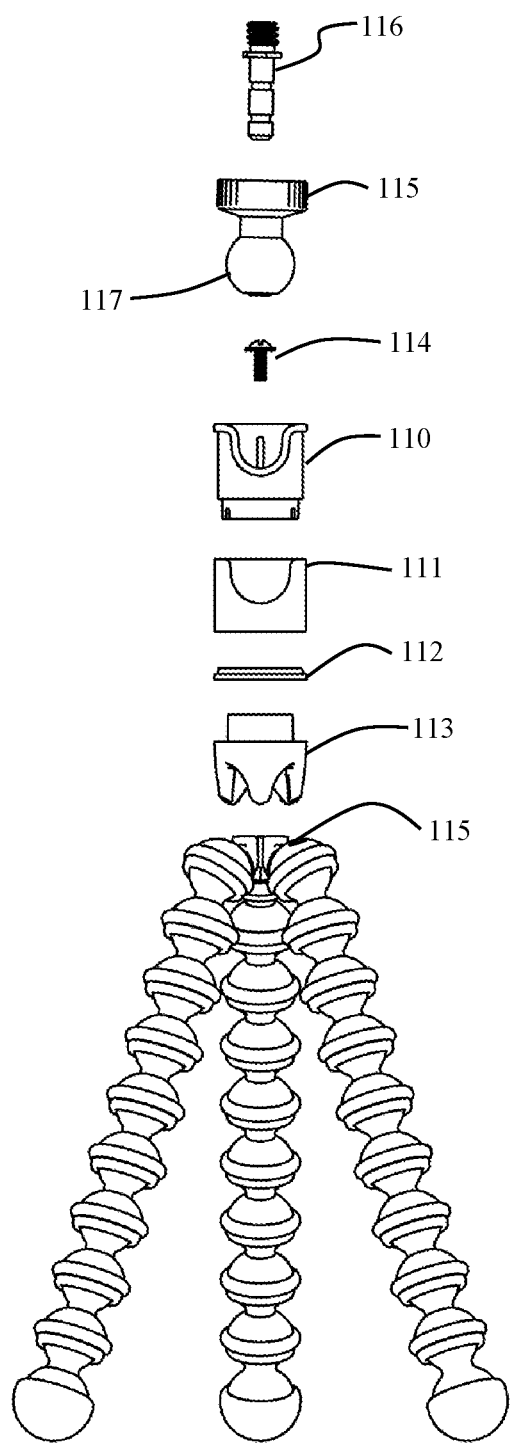
FIG. 5 is an orthogonal exploded view of a tripod according to some embodiments of the present invention.
Figure 6:
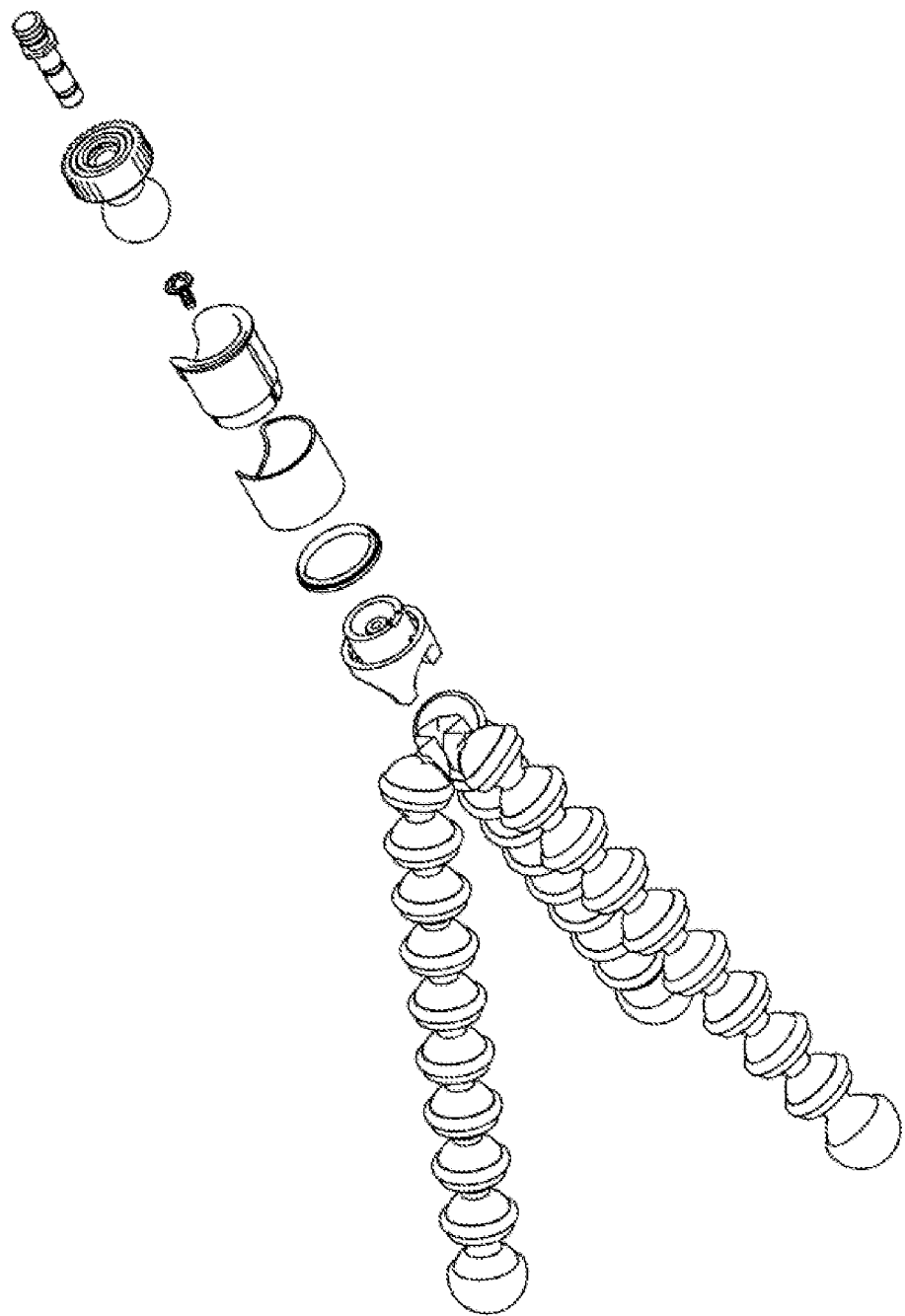
FIG. 6 is an exploded perspective view of a tripod according to some embodiments of the present invention.

FIGS. 4, 5, and 6 illustrate an exploded view of the tripod 100 which demonstrate how the ball and socket joint between the main body and the mounting interface is able to retain tension, and remain in position under some load, even with the missing circumferential component of the cutout 106.

A leg joining piece 115 joins the legs 101 together. The leg joining piece 115 may have ports adapted to receive the flexible legs 101, and may splay out the legs 101 at an angle from vertical to enhance the opportunity to wrap the legs around something, such as a vertical or horizontal bar. The socket liner 110 provides an interface for the ball portion 117 of the mounting interface 115. As seen, the socket liner has a cutout 106. The cutout 106 interrupts the circumferential capture of the ball 117 by the socket. This interruption may weaken the ball and socket connection, and a plastic socket with such an interruption may be quite susceptible to creep of the plastic material, loosening the joint. The loosening of the joint may then lead to insufficient frictional grip of the ball by the socket. In order to support the socket liner 110 with its cutout 106, a socket skirt 111 is placed around the outer perimeter of the socket liner 110 with a mating cutout. In some aspects, the socket liner 110 is plastic, with a cylindrical outer surface and a spherical inner surface, and the socket skirt 111 is metal.

Figure 7:
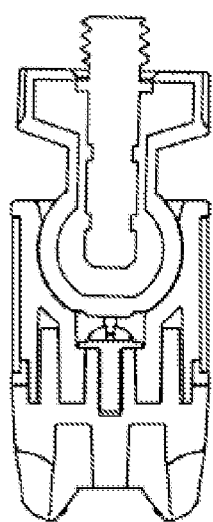
FIG. 7 is a cross-sectional view of a tripod body according to some embodiments of the present invention.

The tripod body 104 may be assembled as a stack wherein the socket liner 110 is placed into the socket skirt 111. The spacer 112 is placed between the socket skirt 111 and the body bottom piece 113. A screw 114 is used to fasten the stack of components together, threading into a receiving threaded portion in the body bottom piece 113. The body 104 may then be coupled to the leg joining piece 115. With this lower end of the tripod assembled, the ball 117 of the mounting interface 106 is snapped into the socket. With the support of the socket skirt 111 the socket will have sufficient rigidity to frictionally hold the ball even with the presence of the cutout 106. The mounting interface may be made of plastic molded over a post 116. FIG. 7 illustrates the tripod body in cross-section.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A tripod comprising:
 a plurality of flexible legs, each of said flexible legs coupled to a lower portion of a main body;
 a main body, said main body comprising an upper portion and a lower portion, said upper portion comprising:
  a socket skirt, said socket skirt comprising an outer surface and a cylindrical inner surface, said outer surface and said inner surface comprising a notch around an upper portion of their circumference; and
  a socket liner, said socket liner residing within said socket skirt, said socket liner comprising a spherical inner surface and a cylindrical outer surface, said socket liner lining the entirety of said inner surface of said socket skirt, said socket liner comprising a notch; and
 an interface portion, said interface portion comprising a ball portion having a spherical outer surface and a device mounting interface portion, said ball residing within said socket liner wherein said spherical outer surface of said ball portion resides within said spherical inner surface of said socket liner with sufficient friction to remain in position under some load, and wherein said interface portion is movable to a plurality of positions including a first position wherein said device mounting interface portion is vertical and a second position utilizing a space circumscribed by said notch in said socket liner and said socket skirt wherein said device mounting interface portion is horizontal.

2. The tripod of claim 1 wherein said socket skirt comprises metal.

3. The tripod of claim 2 wherein said device mounting interface portion comprises a threaded post.

* * * * *